United States Patent [19]
Engelen et al.

[11] Patent Number: 5,591,345
[45] Date of Patent: Jan. 7, 1997

[54] MEMBRANE FOR SEPARATING OFF SMALL MOLECULES AND METHOD FOR THE PRODUCTION THEREOF

[75] Inventors: Charles W. R. Engelen, Alkmaar; Willem F. Van Leeuwen, Heiloo, both of Netherlands

[73] Assignee: Stichting Energieonderzoek Centrum Nederland, Petten, Netherlands

[21] Appl. No.: 307,770
[22] PCT Filed: Mar. 29, 1993
[86] PCT No.: PCT/NL93/00076
§ 371 Date: Feb. 27, 1995
§ 102(e) Date: Feb. 27, 1995
[87] PCT Pub. No.: WO93/19841
PCT Pub. Date: Oct. 14, 1993

[30] Foreign Application Priority Data

Mar. 27, 1992 [NL] Netherlands .............................. 9200575

[51] Int. Cl.$^6$ .................................................. B01D 71/02
[52] U.S. Cl. .................... 210/640; 210/490; 210/500.25; 210/500.26; 427/245
[58] Field of Search ................................. 502/4; 427/244, 427/245; 210/496, 510.1, 502.1, 490, 500.22, 500.25, 500.26, 640, 650, 651, 652

[56] References Cited

U.S. PATENT DOCUMENTS 3,421,948 1/1969 Webb .
5,019,263 5/1991 Haag et al. .
5,362,522 11/1994 Barri et al. .............................. 427/435

FOREIGN PATENT DOCUMENTS

| 0369629 | 5/1990  | European Pat. Off. . |
| 0400961 | 12/1990 | European Pat. Off. . |
| 0481660 | 4/1992  | European Pat. Off. . |
| 0481659 | 4/1992  | European Pat. Off. . |
| 0481658 | 4/1992  | European Pat. Off. . |
| 3827049 | 2/1990  | Germany . |
| 3246414 | 9/1991  | Japan . |

*Primary Examiner*—Frank Spear
*Attorney, Agent, or Firm*—Young & Thompson

[57] ABSTRACT

The invention provides a membrane for separating molecules from mixtures, which membrane consists virtually exclusively of molecular sieve crystals, has a thickness of 0.01–10 mm and has a separating top layer with a thickness of 0.01–10 μm and an effective pore size of less than 1.5 nm, which pore size can be adjusted depending on the molecules to be separated off. The separating membrane can be produced by a method in which: a) pulverulent molecular sieve material and oxides constituting the molecular sieve material, especially zeolite and kaolin and/or silicon dioxide, are mixed, preferably in the presence of water; b) the mixture is shaped; c) the moulding is calcined; d) the calcined moulding is treated with an aqueous solution which promotes crystallization; and e) the moulding is treated with a solution of the oxides constituting the molecular sieve material, and then rinsed and dried. The separating membrane can consist of one component or be combined with, for example, an alumina support. The membrane can also be rendered catalytically active by treatment with hydrogen ions or with catalytic metals.

17 Claims, 4 Drawing Sheets

MEMBRANE FOR SEPARATING OFF SMALL MOLECULES AND METHOD FOR THE PRODUCTION THEREOF

FIELD OF THE INVENTION

The invention relates to a membrane based on molecular sieve material for separating small molecules from mixtures and to a method for the production thereof, according to which method a porous support is treated with a solution which contains the appropriate metalate ions such as aluminate and silicate ions, and optionally alkali metal or alkaline earth metal ions.

BACKGROUND OF THE INVENTION

German Patent Application 3,827,049 discloses a membrane which is produced by applying a crystallisation-promoting layer to a support, for example a metal or ceramic support, and allowing zeolite A to grow thereon from a solution which contains silicate, aluminate and sodium.

In addition, European Patent Application 135,069 discloses a composite membrane which consists of a porous support on which a continuous zeolite layer has been applied, which membrane can be obtained by depositing a gel which contains zeolite constituents on a porous support and allowing the gel to crystallise at elevated temperature.

U.S. Pat. No. 5,019,263 discloses a non-composited microporous membrane consisting of crystalline molecular sieve material, in particular silicon dioxide or zeolite. This membrane is produced by depositing crystalline material of the desired composition from a solution onto an auxiliary carrier, removing the crystalline material from the auxiliary carrier and calcining it. Because of the small thickness (0.1–400 μm) the residual membrane is difficult to handle and has little resistance to substantial differences in pressure.

A method for the production of crystalline zeolite is disclosed in U.S. Pat. No. 3,119,660. According to this method amorphous kaolin is pressed to give mouldings and the mouldings are treated at elevated temperature with an alkaline solution which also contains the zeolite constituents; this zeolite is intended for absorption and not for gas separation.

SUMMARY OF THE INVENTION

A separating membrane has now been found which has a pore size which can be accurately adjusted so that a sharp separation of components from a mixture can be achieved. The membrane has a permeability and thickness such that a high separation rate can be achieved and the pressures which may be needed for this separation can be withstood.

The separating membrane according to the invention consists virtually exclusively of molecular sieve crystals, has a thickness of 0.01–10 mm and has a separating top layer with a thickness of 0.01–10 μm and an effective pore size of the separating layer of less than 1.5 nm.

The molecular sieve material can be of a common type. Useful molecular sieve materials are zeolites, which are composed of silicon oxides (silicates), mostly aluminium oxides (aluminates) and often alkali metal or alkaline earth metal ions. The ratio of silicon to aluminium atoms in the zeolites is generally 1 or higher. The aluminium atoms may be partly or entirely exchanged by other trivalent atoms, in particular boron, gallium or iron, whereas the silicon atoms may be partly or entirely exchanged by other tetravalent atoms, in particular titanium or germanium.

The molecular sieve material may also be of the aluminophosphate type, i.e. molecular sieves composed of aluminium oxides (aluminates) and phosphoric oxides (phosphates), optionally together with other oxides such as silicates (silicoaluminophosphates) and oxides of other metals such as Ti, Ge, As, Zr, Mo, Sn, Sb and the like (metaloaluminophosphates or metaloaluminophosphosilicates).

Preferably, the zeolite crystals are of the synthetic type A having the formula $\{M^{n+}_{12/n}[Al_{12}Si_{12}O_{48}] \cdot 27H_2O\}_8$, X having, for example, the formula $M^{n+}_{5/n}[Al_{86/n}Si_{106}O_{304}] \cdot 264H_2O$ or Y having, for example, the formula $M^{n+}_{56/n}[Al_{56}Si_{136}O_{384}] \cdot 250H_2O$, in which M is an alkali metal (n=1) or an alkaline earth metal (n=2). The pore system of these zeolites is three-dimensional. The zeolite can also be of the ZSM-5 or silicalite type.

The thickness of the membrane, when it is a one-component, self-supporting membrane, is preferably 0.5–10 mm, more preferably 0.5–5 mm and particularly between 1 and 2 mm; when the membrane is supported by e.g. a metal or a ceramic having relatively large pores, its thickness is preferably between 0.01 and 0.1 mm. The effective pore size is preferably between 0.2 and 1.5 nm, more preferably between 0.25 and 1 nm; even more preferentially the effective pore size is from 0.3 to 0.8 nm. Preferably less than 1% by weight of impurities, in particular quartz, is present in the membrane.

The size of the pore openings is determined on the one hand by the crystal structure (the size of the aluminosilicate, aluminophosphate etc. rings which delimit the pore) and, on the other hand, by the cations which can be located in the pores. For potassium, sodium and calcium, the effective pore diameters of zeolite type A are, respectively, 0.30, 0.42 and 0.48 nm. If these figures are compared with the kinetic diameters of a number of small molecules, it can be seen that zeolite A in the potassium form (KA) is suitable for separating, on the one hand, He, $H_2$ and $H_2O$ from, on the other hand, $CO, CO_2, CH_4, C_2H_4, C_2H_6, C_3H_8$ and, of course, larger molecules. In the case of zeolite types X and Y the effective pore diameters are correspondingly between 0.6 and 0.8 nm and in the case of ZSM-5 are around 0.5 nm. Membranes of this type are therefore one suitable for separating small molecules such as $H_2$ and He at a high permeation rate from larger molecules such as methane, propane, butane and the like.

The preference for zeolite A, X and Y is based on the favourable pore dimensions which can be varied simply by means of ion exchange, the thermal stability at temperatures of up to 600° C. and the ease with which it can be synthesised. The three-dimensional character of types A, X and Y is also an advantage because, as a result, the orientation of the crystal is not critical for the separation performance. ZSM-5 and silicalite have a two-dimensional structure and are therefore also suitable.

A method for the production of a separating membrane which has the above advantages has also been found. The method according to the invention is characterised in that:

a) pulverulent molecular sieve material and the oxides constituting the molecular sieve material are mixed, preferably in the presence of water;

b) the mixture is shaped;

c) the moulding is calcined;

d) the calcined moulding is treated with an aqueous solution which promotes crystallisation; and e) the moulding is treated with a solution of the oxides which constitute the molecular sieve material and, where appropriate, alkali metal or alkaline earth metal ions, as molecular sieve constituents, and then rinsed and dried.

In the production of zeolite membranes, in step a) pulverulent zeolite and kaolin and/or silicon dioxide are mixed, and in step e) the moulding is treated with a solution of silicate and alkali metal or alkaline earth metal and optionally aluminate as zeolite constituents.

In the case of the production of e.g. aluminophosphate membranes, pulverulent (crystalline) aluminophosphate molecular sieve material and amorphous aluminophosphate are mixed in step a); as an alternative, crystalline aluminophosphate and aluminium oxide and phosphoric acid may be mixed in step a). In step e) the moulding is then treated with a solution of aluminate (boehmite) and phosphoric acid as molecular sieve constituents.

Similarly, the appropriate other oxides and/or ions are used when producing e.g. boresilicate, ferrosilicate, gallosilicate, aluminotitanate, aluminogermanate, silicoaluminophosphate, titanoaluminophosphosilicate etc. membranes.

The method according to the invention is further explained below with reference to the production of zeolite membranes, but it will be understood that the description also applies to the production of other molecular sieve material membranes by substituting the corresponding elements and oxides.

In the first step a) of the method, zeolite powder and kaolin and/or silicon dioxide are mixed, preferably in the presence of water. The zeolite is preferably of the type A, X, Y, ZSM-5 or silicalite. If a type A zeolite is used, only the zeolite and kaolin are mixed as pulverulent constituents. If a type X, Y or ZSM-5 zeolite is used, an amount of silicon dioxide corresponding to the particular type is also admixed. When silicalite, which contains no aluminium, is used, only the zeolite and silicon dioxide are mixed. The silicon dioxide can be of a common, preferably amorphous, type, for example silicasel or aerosil.

The kaolin used is preferably mainly kaolinite, $2SiO_2.Al_2O_3.2H_2O$. The kaolin must be pure and preferably contain less than 5% by weight of impurities, such as quartz and anatase. In particular, the kaolin must contain less than 1% by weight and more particularly less than 0.3% by weight of quartz. This is because it has been found that too high a content of quartz and other impurities leads to holes in the surface structure and thus to a less sharp separation. The weight ratios between the zeolite and the kaolin (including any silicon dioxide) are generally between 95:5 and 5:95. Preferably a weight ratio of 80:20 to 20:80, more preferably of 75:25 to 25:75 and most preferably of 65:35 to 40:60 is used. The particle size of the zeolite, kaolin and any silicon dioxide is not particularly critical and can be that of the commercially available grades. Preferably, the particle size is less than 5 μm. Mixing can be promoted by homogenising a suspension of the constituents, to which binders, plasticisers and deflocculants can be added if appropriate. The suspension can then be spray-dried to give particles having a particle size of preferably at most 100 μm.

In step b) the dry mixture is then shaped by pressing, if a membrane composed of zeolite only is produced. The shape is dependent on the intended application and can be, for example, a sheet or a hollow tube. Shaping is carried out in a manner known per se.

The moulding is then calcined in step c), kaolin being converted to metekaolin. Calcination is carried out at a temperature of preferably 550°–800° C.; in particular a temperature of about 600°–700° C. is used. Heating and cooling are preferably carried out gradually. Partly depending on the calcination temperature, this temperature is maintained for from a few minutes to a few hours.

In the subsequent step d), the metakaolin is converted into zeolite by treatment with an aqueous solution which promotes crystallisation. This crystallisation-promoting solution can be an alkaline solution having a pH of at least 10, preferably a pH of at least 12, and, if zeolite type A is used, more preferentially a pH of between 13 and 14. The alkaline solution can be, for example, a 0.2–2 N, in particular a 0.5–1N solution of NaOH in water. The treatment with the crystallisation-promoting solution can be carried out at room temperature or at elevated temperature, for from a few hours to a few days. Preferably, a temperature of 25°–200° C. is applied for a period of 12 to 96 hours. In the case of type A or X, the treatment temperature is preferably 50°–100°C., in the case of type Y preferably 80°–150° C. and in the case of ZSM-5 and silicalite preferably 120°–200° C. In the latter case, the alkaline solution also contains the further components which are needed for the synthesis of these types, such as templating agents, in particular tetrapropylammonium ions. Instead of using a solution containing hydroxide ions for promoting crystallisation of the zeolite types (e.g. A, X, Y, ZSM-5 and silicalite) a solution containing fluoride ions can be used in step d), in which case the solution is not necessarily alkaline.

As a result of this treatment the molecular sieve crystals grow together. Table A gives the average pore sizes in μm and the porosity in % of a raw zeolite membrane obtained in step d) using a solution having a pH of 13.4 for 24 hours at 95° C., as a function of the kaolin content in the starting mixture, for zeolite A.

After step d) the moulding is preferably rinsed.

TABLE A

| % kaolin | average pore size (μm) | porosity (%) |
|---|---|---|
| 25 | 0.37 | 23.9 |
| 37.5 | 0.29 | 22.8 |
| 50 | 0.14 | 14.0 |

In case of producing aluminophosphate membranes, an acidic solution is used in step d) in order to promote crystallisation of the calcined oxides. This acidic solution has an initial pH of about 2 or higher, preferably about 3, which pH tends to increase during the crystallisation step, e.g. to a pH of 5 to 8. To the acidic crystal-lisation-promoting solution a templating agent must be added. Suitable templating agents include aliphatic and aromatic mines, such as trialkylamines, diethylethanolamine, picoline, pyrrolidine, dimethylpiperazine, (di)cyclohexylamine, and their protonated ammonium ions, as well as quaternary ammonium ions such as choline, tetrapropylammonium and methylpyridinium. Their concentration may be from 0.01 to 1 mole/l.

A further improvement of the process of the invention can be achieved if the raw membrane thus obtained is treated with a molecular sieve sol, as a result of which a smooth surface layer which has a thickness of the order of 0.1–5 μm and a small particle size can be obtained, which can lead to a membrane of higher permeability. To this end the moulding is treated with a suspension or sol of molecular sieve crystals having a particle size of less than 0.2 μm, preferably of less than 0.1μm. Depending on the type of molecular sieve chosen in step a), the molecular sieve material of this sol step is likewise preferably a zeolite of type A, X, Y, ZSM-5 or silicalite, or e.g. an aluminophosphate.

Instead of treating the raw membrane with a molecular sieve sol as described above, a treatment with an organic polymer can advantageously be performed so as to avoid penetration of the closing particles into the moulding in order to finally obtain a thin surface layer having an increased permeability. According to this embodiment of the method of the invention, the moulding obtained after step d) is coated with an organic polymer, such as a (substituted) polyethylene or a polymer wax, having a melting point above the temperature used in step e), in particular above 200° C., and having an oxidation, vaporisation and/or decomposition temperature below 600° C. The polymer should have a low solubility in water and should be capable of adhering to the moulding. The polymer preferably contains polar groups, such as amide groups, carboxyl groups or hydroxyl groups, allowing a good adhesion on the zeolite support. Suitable materials include commercially available waxes such as Hoechst Wachs PED 136 and Hoechst Ceridust 3715. The polymer can be coated by conventional means, such as by means of a film or dispersion or solution deposition. The coated polymer layer on the raw membrane should be very thin, preferably less than 0.01 μm. After step e), the moulding is then heated above the oxidation (vaporisation, decomposition) temperature of the polymer, e.g. at 400°–600° C., preferably in the presence of oxygen, so as to remove the polymer layer. This treatment results in a membrane having at the same time a sharp transition and an excellent adhesion between the support layer and the separation layer.

Finally, the pores of the resulting membrane are sealed at the surface in step e) in order to obtain a membrane having the desired separation characteristics. To this end, the moulding is treated with a solution of molecular sieve constituents of the desired type, in particular with a solution of silicate, aluminate and alkali metal or alkaline earth metal ions in the case of zeolites. The treatment is preferably carried out at elevated temperature, such as between 25° and 150° C., in particular at 50°–100° C., 80°–150° C., 120°–200° C. and 50°–200° C. for the types zeolite A/X, Y, ZSM-5/silicalite, and aluminophosphate respectively, for a period of 4–96 hours. The aluminate and silicate (or phosphate) concentration in the solution is, for example, between 0.2 and 1 molar and the mutual ratio is determined by the type of zeolite. The result of this treatment is a membrane which has a thin top layer (of the order of 0.01–10 μm) which has only molecular sieve pores, in other words a closed surface.

When producing a membrane of zeolite A, X or Y, a solution which also contains an organic amine in addition to the zeolite constituents is preferably used in step e). In this way the controlled crystal growth in the membrane is promoted, whilst crystal formation in the solution is prevented.

Organic amines which can be used in this respect are water-soluble amines having at least one alkyl group, such as butylamine or dipropylamine, or cyclic amines, such as piperidine or morpholine. Preferably an amine is used which contains one or more hydroxyl groups and/or further amino groups, such as ethanolamine (2-aminoethanol), 2-dimethylaminoethanol, ethylenediamine, isopropanolamine (1-amino 2-propanol), 2-amino-2-methyl-1-propanol, diethanolamine, diethylenetriamine, 1-(2-aminoethyl)piperazine, 2-aminoethylaminoethanol and in particular triethanolamine. The amine can be present in the solution in an amount of, for example, 5–25% by weight.

The use of such amines when growing large zeolite-NaA crystals is described by J. F. Charnell, J. Crystal Growth. 8, 291–294 (1971). The use of such amines in step e) is not necessary when before step e) the moulding has been coated with a polymer as described above.

When producing a membrane of zeolite ZSM-5 or silicalite type or aluminophosphate and the like types, the solution to be used in step e) preferably contains a templating agent of the appropriate type (amine or ammonium ions) as described above.

After the treatment with the molecular sieve constituents and, where appropriate, the organic amine or ammonium salt, the moulding is rinsed and dried. Drying is preferably carried out with slow heating (2°–4° C. per hour) to, for example, 300°–450° C., followed by slow cooling.

In the separating membrane thus obtained the effective pore size, and thus the separation criterion, can be modified afterwards by exchanging the cations of the zeolite crystal. Thus, by exchanging sodium ions by potassium ions in zeolite type A, a separating membrane can be obtained which has an effective pore size of 0.30 instead of 0.42 nm.

The separating membrane according to the invention is found to be stable to temperatures of at least 450° C. This is due to the fact that the supporting part and the separating part of the membrane have the same coefficient of expansion, as a result of which no cracking occurs during drying and other heat treatments. The membrane according to the invention is also able to withstand pressures of about 6 bar. Using a membrane according to the invention of zeolite type NaA which has been produced in the manner described above, a temperature of 85° C. being applied for 72 hours in step d), a permeation selectivity for helium/propane of more than 8 is achievable for an overpressure of 3.7 bar.

The membrane thus obtained consists mainly or entirely of molecular sieve material and can be used as such. In this embodiment it has a preferred thickness of 0.5–10 ram. On the other hand, a composite membrane can be produced by combination with a support having large pores, for example consisting of a metal (Fe, Al, Si) or a ceramic material (mullite, corderite, alumina). In this embodiment, the separating molecular sieve membrane has a preferred thickness of 10–100 μm. The adhesion between the zeolite membrane and a support of this type can be achieved, for example, by applying a suspension of the mixture of zeolite and kaolin and, where appropriate, silicon dioxide to a support in step b) of the method according to the invention (slip casting). The support, for example aluminium oxide, preferably has pores which have dimensions of the order of 1–5 μm. The shaped, coated support thus obtained is then calcined and further treated in accordance with steps c)-e) described above.

According to the invention, a catalytically active membrane can also be produced. To this end, the membrane obtained in the manner described above is treated with hydrogen ions (acid), as a result of which some of the alkali (alkaline earth) metal ions in the zeolite lattice are replaced by hydrogen ions, or the membrane is treated with a catalytically active metal or salt thereof, such as palladium or chloroplatinic acid, followed by conversion of the metal salt into the metal where appropriate. Catalytically active metals, such as Pd, Pt, Ru, Mo etc. can also be incorporated into the membrane during step e) of the method described above. The membrane thus obtained selectively catalyses reactions, such as isomerisation and decomposition (cracking), of small hydrocarbons.

The invention also relates to a method for separating small molecules from a mixture (gas separation, pervaporation), a membrane as described above being used. The method is particularly suitable for the separation of, on the one hand, hydrogen and/or helium and, on the other hand, carbon monoxide, carbon dioxide and/or methane and higher hydrocarbons.

Figure 1:
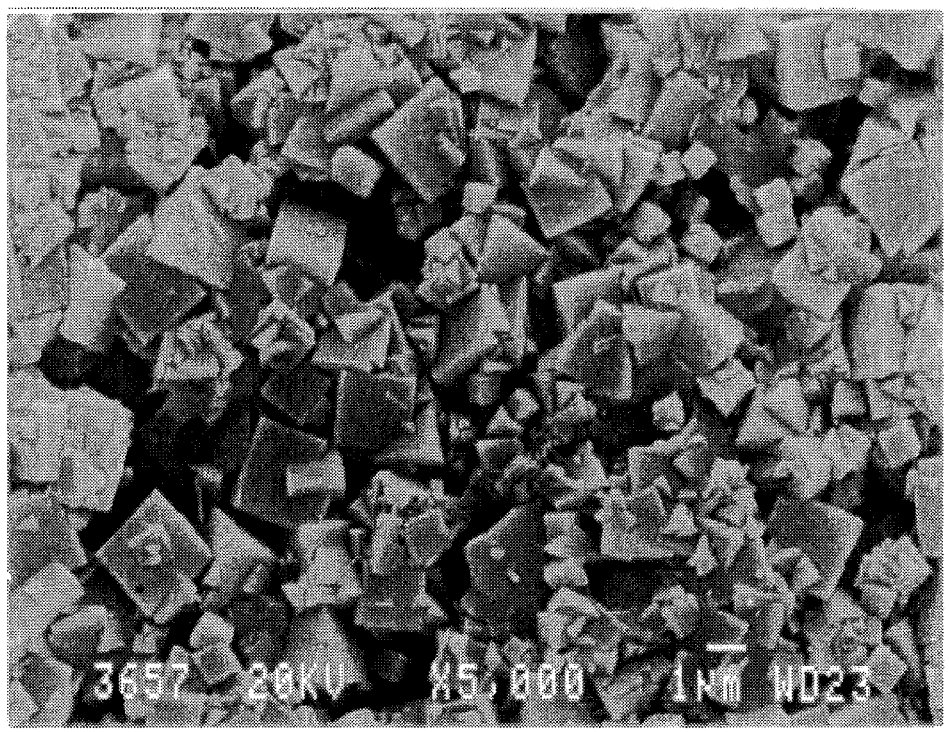
FIG. 1 is an SEM (Scanning Electron Microscope) photograph of the surface of an as yet unclosed zeolite A membrane (step (e) of the method according to the invention has not yet been carried out).
Figure 2:
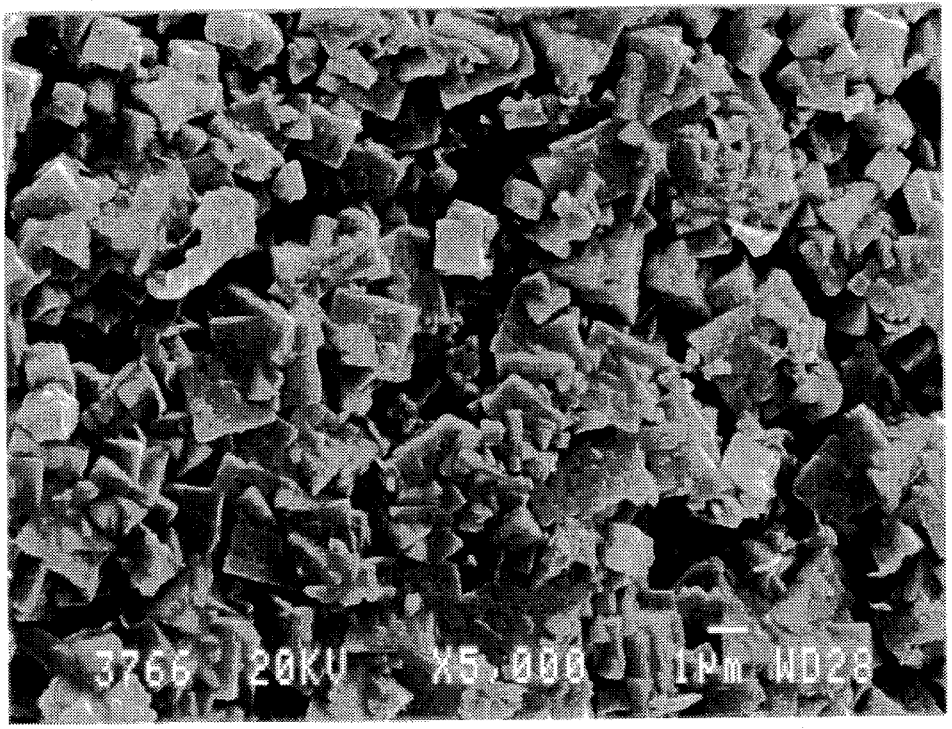
FIGS. 2, 3, 4 and 5 show the same surface after closing for 4, 8, 16 and 24 hours (step (e) of the method of the invention), respectively. The figures clearly illustrate that the treatment leads to filling of the holes between the zeolite crystals at the surface.
Figure 3:
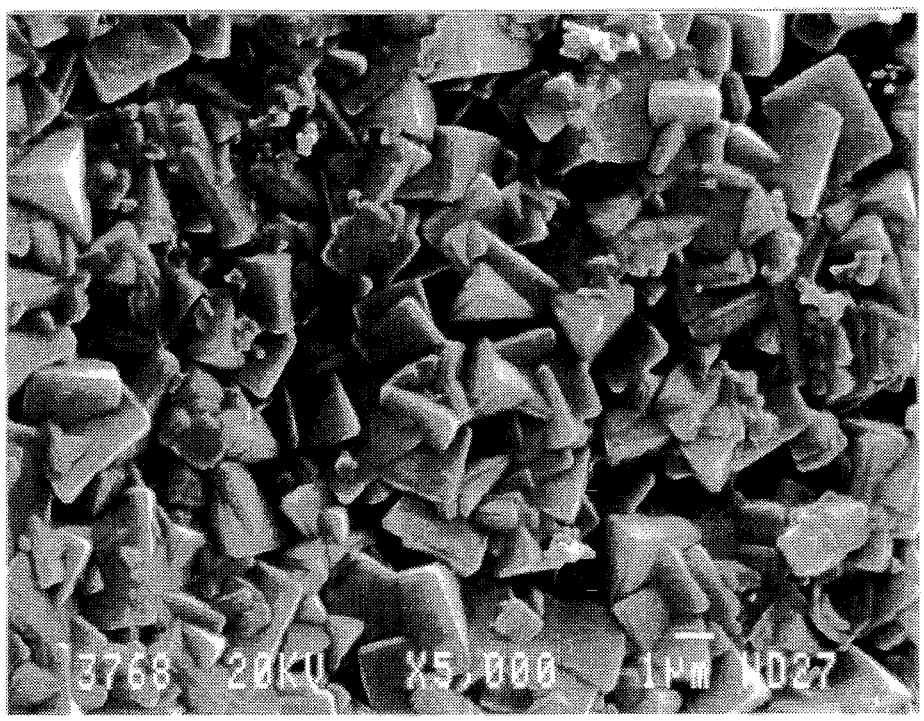
Figure 4:
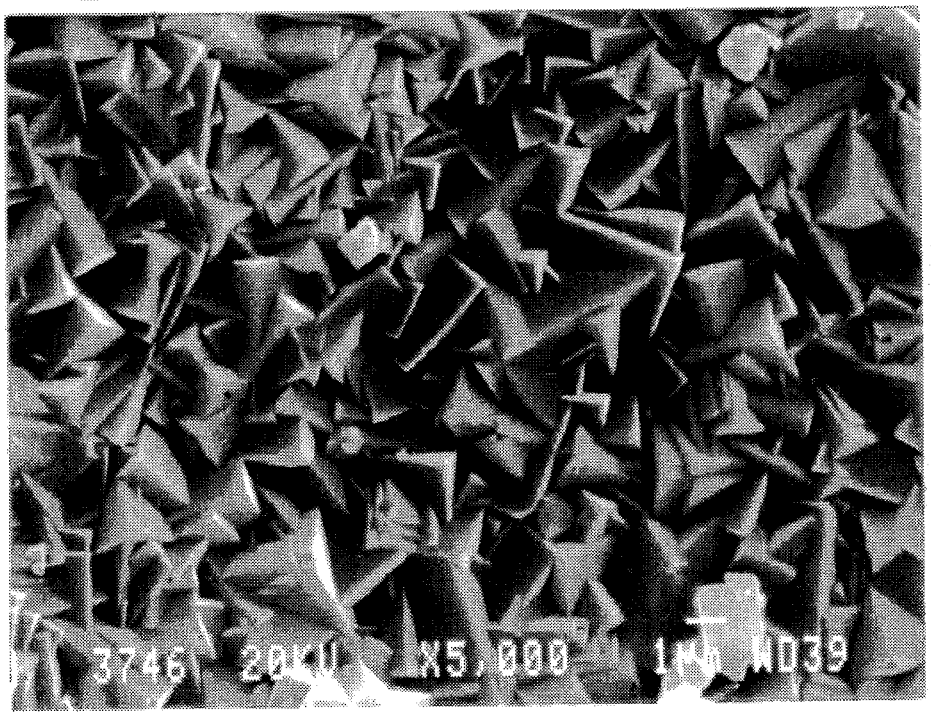
Figure 5:
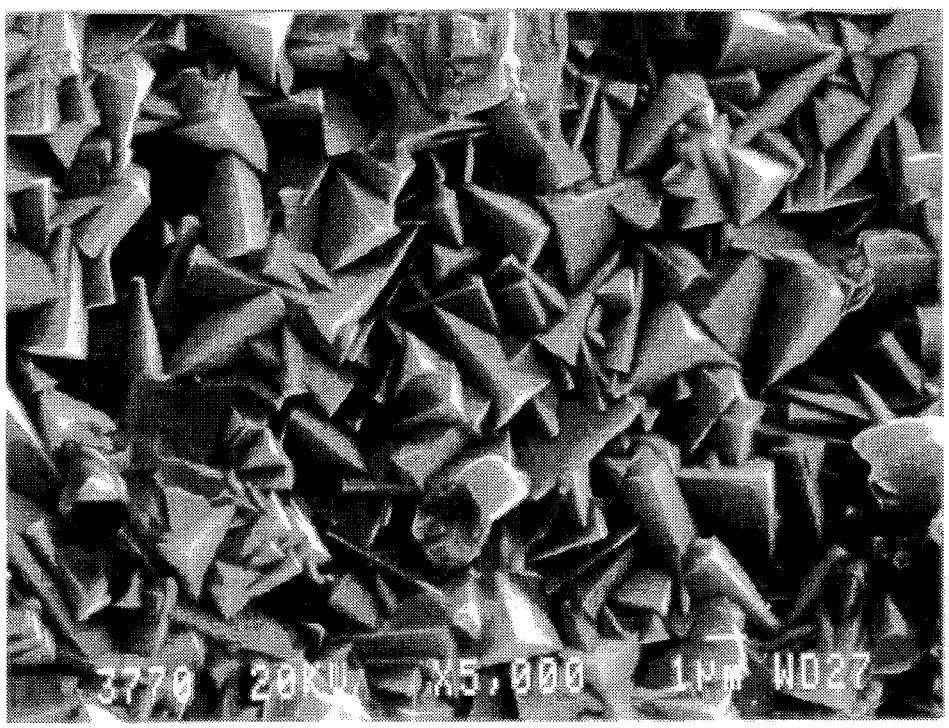
Figure 6:
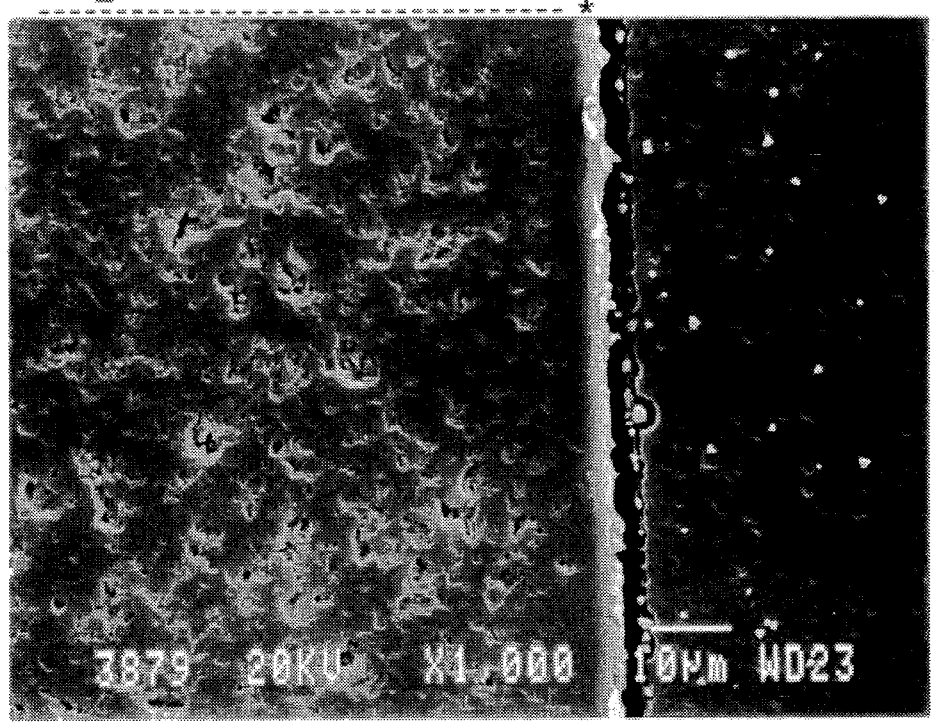
FIG. 6 shows an SEM photograph (×1000) of a surface, obtained by fracture and subsequently polishing and etching, of a top layer obtained after closing for 16 hours (step e) ( - - - indicates the porous support layer; * indicates the closed top layer). It shows a gradual transition from supporting layer to top layer.
Figure 7:
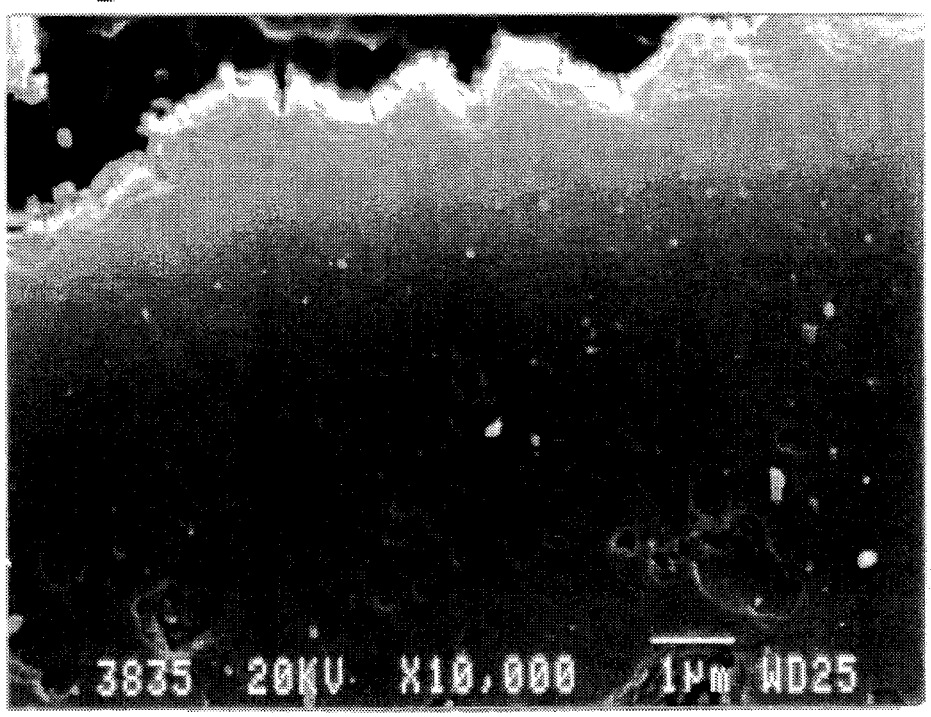
FIG. 7 is a further enlarged (×10,000) SEM photograph of a polished and etched surface of rupture of a top layer obtained after closing for 72 hours.

EXAMPLE I 170.25 g of zeolite A powder and 150.0 g of kaolin containing less than 0.1 per cent by weight of quartz are added to 380 ml of water in which 3.0 g of polyvinyl alcohol (binder), 12.0 g of polyethylene glycol (plasticiser) and 3.0 g of sodium metasilicate (deflocculant) have been dissolved.

The suspension was homogenized by mixing and rotation on a roll mill and spray-dried. Using a pressure of 1 kbar, sheets having a diameter of 25 mm and a weight of 1.0 gram were pressed from the powder.

The sheets were heated at 650° C. for one hour. After cooling to room temperature, a sheet was placed vertically in a liquid consisting of 0.35 g of NaOH and 12.65 g of $H_2O$. After 16 hours at room temperature, liquid and sheet were heated at 95° C. for 24 hours. After this crystallisation step, the sheet was washed and stored in water.

The wet sheet was placed in an aluminosilicate solution consisting of: 1.14 g of $Na_2SiO_3.9H_2O$, 0.91 g of $NaAlO_2$, 2.28 g of triethanolamine and 15.93 g of water and heated at 85° C. for 72 hours. After this second crystalisation step, the sheet was washed and dried.

Permeation measurements were carried out on three sheets which were prepared in this way independently of one another. As a consequence of closing, the permeability decreases sharply (from $2.4 \times 10^{-4}$ to $1.1 \times 10^{-10}$ mole/$m^2$.s.Pa for hydrogen at 1.5 bar, see table C). After exchanging the sodium ions by calcium ions, the effective pore size increases from 0.42 to 0.48. In this case, the permeability for hydrogen increases sharply (see Table B). This is an indication that the transport through the membrane proceeds solely via the zeolite pores.

TABLE B

| cation | effective pore size (nm) | permeability at 1.5 bar $H_2$ ($10^{-9}$ mole/$m^2 \cdot s \cdot Pa$) | | |
| --- | --- | --- | --- | --- |
| $Na^+$ | 0.42 | 0.11 | 0.17 | 0.19 |
| $Ca^{2+}$ | 0.48 | 290 | 340 | 860 |

Table C shows the hydrogen permeability of the membrane as a function of the closing time (step e). It can be calculated that the top layer accounts for at least 99.9% of the resistance to gas transport of the membrane. This means that the permeability of the membrane is entirely determined by the top layer.

Table D shows the hydrogen permeability of the membrane after closing for 72 hours as a function of pressure. The permeability appears to be independent of the pressure drop over the membrane and thus no laminar flows occur.

TABLE C

| membrane | closing time (h) | permeability (mole/$m^2 \cdot s \cdot Pa$) |
| --- | --- | --- |
| 7 | 0 (support) | $2.4 \times 10^{-4}$ |
| 8 | 16 | $2.9 \times 10^{-5}$ |
| 9 | 48 | $8.2 \times 10^{-7}$ |
| 10 | 72 | $1.1 \times 10^{-10}$ |

TABLE D

| pressure drop (bar) | permeability ($10^{-10}$ mole/$m^2 \cdot s \cdot Pa$) |
| --- | --- |
| 1.55 | 1.67 |
| 1.99 | 1.66 |
| 2.35 | 1.61 |
| 3.41 | 1.58 |
| 4.03 | 1.60 |
| 4.49 | 1.60 |
| 6.04 | 1.64 |

We claim:

1. Method for the production of an asymmetric molecular sieve membrane for separating small molecules, comprising the steps of:

a) mixing pulverulent molecular sieve material and oxides constituting the molecular sieve material;

b) shaping the mixture into a moulding;

c) calcining the moulding;

d) treating the calcined moulding with an aqueous solution which promotes crystallization; and e) treating the moulding with a solution of the oxides constituting the molecular sieve material, and rinsing and drying it.

2. Method according to claim 1 for the production of a zeolite membrane, in which:

a) pulverulent zeolite and kaolin and/or silicon dioxide are mixed in the presence of water; and e) the moulding is treated with a solution of silicate, aluminate, and alkali metal or alkaline earth metal as zeolite constituents, and then rinsed and dried.

3. Method according to claim 2, in which, in step a), the zeolite and kaolin and/or silicon dioxide and, in step e), the zeolite constituents are chosen in such a way that zeolite type A, X, Y, ZSM-5 or silicalite is obtained.

4. Method according to claim 1, in which, in step a) a weight ratio between pulverulent molecular sieve material and oxides of from 80:20 to 20:80 is used.

5. Method according to claim 1, in which, in step a), oxides are used which contain less than 5% by weight, of quartz and/or other impurities.

6. Method according to claim 1, in which, in step c) a temperature of 550°–800° C. is used.

7. Method according to claim 1, in which, after step d), the moulding is treated with a sol of molecular sieve crystals having a particle size of less than 0.2 μm.

8. Method according to claim 1, in which, after step d), the moulding is coated with an organic polymer having a melting point above the temperature used in step e) and having an oxidation, vaporisation and/or decomposition temperature below 600° C. and after step e), the moulding is heated above the vaporisation and/or decomposition temperature of the polymer.

9. Method according to claim 1, in which, in step e) an organic amine is used.

10. Method according to claim 1, in which a membrane consisting virtually exclusively of molecular sieve crystals is produced by spray-drying the mixture after step a) and shaping the mixture by pressing in step b).

11. Method according to claim 1, in which a composite membrane is produced by, in step b), applying the mixture in the form of a suspension to one of a porous ceramic support a porous metal support.

12. Method for the production of a catalytically active membrane, in which the membrane obtained in accordance with claim 1 is treated with hydrogen ions or with a catalytically active metal or salt thereof.

13. Method for separating small molecules from a mixture, in which a membrane produced by the method according to claim 1 is used.

14. Supported membrane suitable for separating small molecules from a mixture, which membrane is asymmetric and is composed of:
  i) a metal or ceramic support having pore dimensions of the order of 1–5 μm;
  ii) a macroporous layer having a thickness of 10–100 μm, having an average pore size larger than the effective pore size of a separating top layer, and consisting essentially of molecular sieve crystals, and
  iii) said separating top layer having a thickness of 0.01–10 μm, having an effective pore size of less than 1.5 nm, and consisting of molecular sieve crystals of the same material as the macroporous layer.

15. Method for separating small molecules from a mixture, in which a membrane according to claim 14 is used.

16. Membrane according to claim 14, wherein the separating top layer has an effective port size of 0.25–1 nm.

17. Membrane according to claim 14, wherein said macroporous layer and said separating top layer contain less than 1% by weight of quartz.

* * * * *